March 8, 1927. 1,620,494
P. R. SCHNABEL
VEHICLE BODY
Filed April 18, 1924 6 Sheets-Sheet 2

March 8, 1927.

P. R. SCHNABEL

VEHICLE BODY

Filed April 18, 1924

Witnesses:
Edwin Trueb

Inventor:
PAUL R. SCHNABEL,
by R. D. Little
his Attorney.

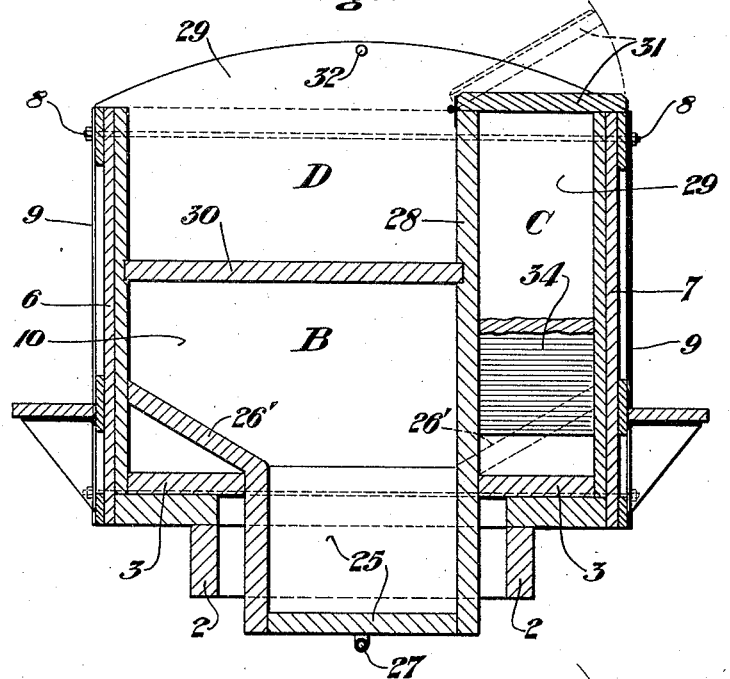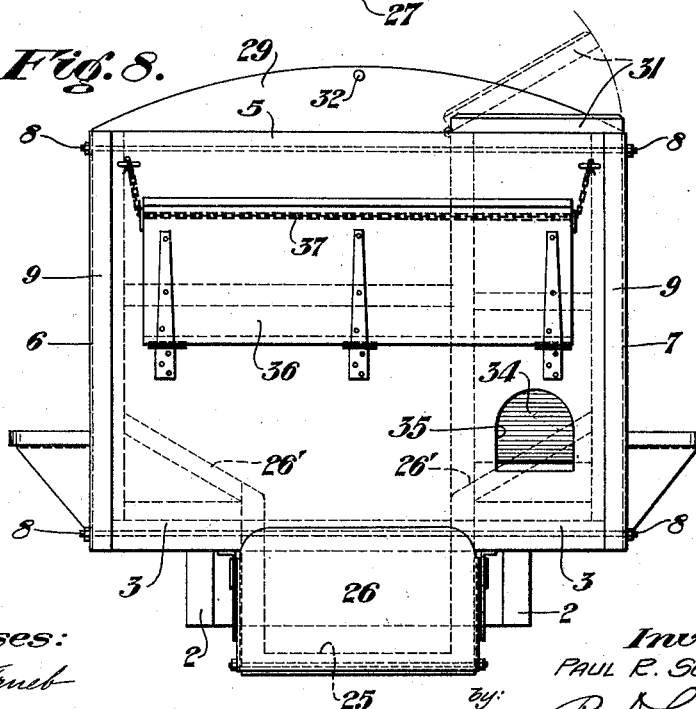

Patented Mar. 8, 1927.

1,620,494

UNITED STATES PATENT OFFICE.

PAUL R. SCHNABEL, OF OAKMONT, PENNSYLVANIA, ASSIGNOR TO THE SCHNABEL COMPANY, OF PITTSBURGH, PENNSYLVANIA, A CORPORATION OF PENNSYLVANIA.

VEHICLE BODY.

Application filed April 18, 1924. Serial No. 707,377.

This invention relates to vehicle bodies, and more particularly to vehicle bodies primarily designed for the transportation of frozen products, such as ice cream, and has for one of its objects the provision of an improved vehicle body of this class including a novel refrigerating compartment.

Another object is to provide a vehicle body including a separate product compartment, ice compartment, salt compartment, and storage compartment, all arranged in a novel manner so as to facilitate the loading and discharge of the materials and products carried.

A further object is to provide a body construction in which the various walls forming the body have interfitting joints and are removably secured together by transverse tie bolts, so as to form a knock-down structure to facilitate shipment.

A still further object of the invention is to provide a vehicle body having the novel design, construction, and combination of parts hereinafter described and illustrated in the accompanying drawings.

In the drawings, Figure 1 is a side elevation of a completed body embodying my invention.

Figures 5, 6 and 7 are transverse sectional elevations taken on the lines V—V, VI—VI, and VII—VII, respectively, of Figure 1.

Figure 8 is a rear elevation of the body.

Figure 9 is an enlarged detail of one of the front corners of the body, showing the manner in which the front end and side walls interfit and the angle iron binding member.

Figure 1:
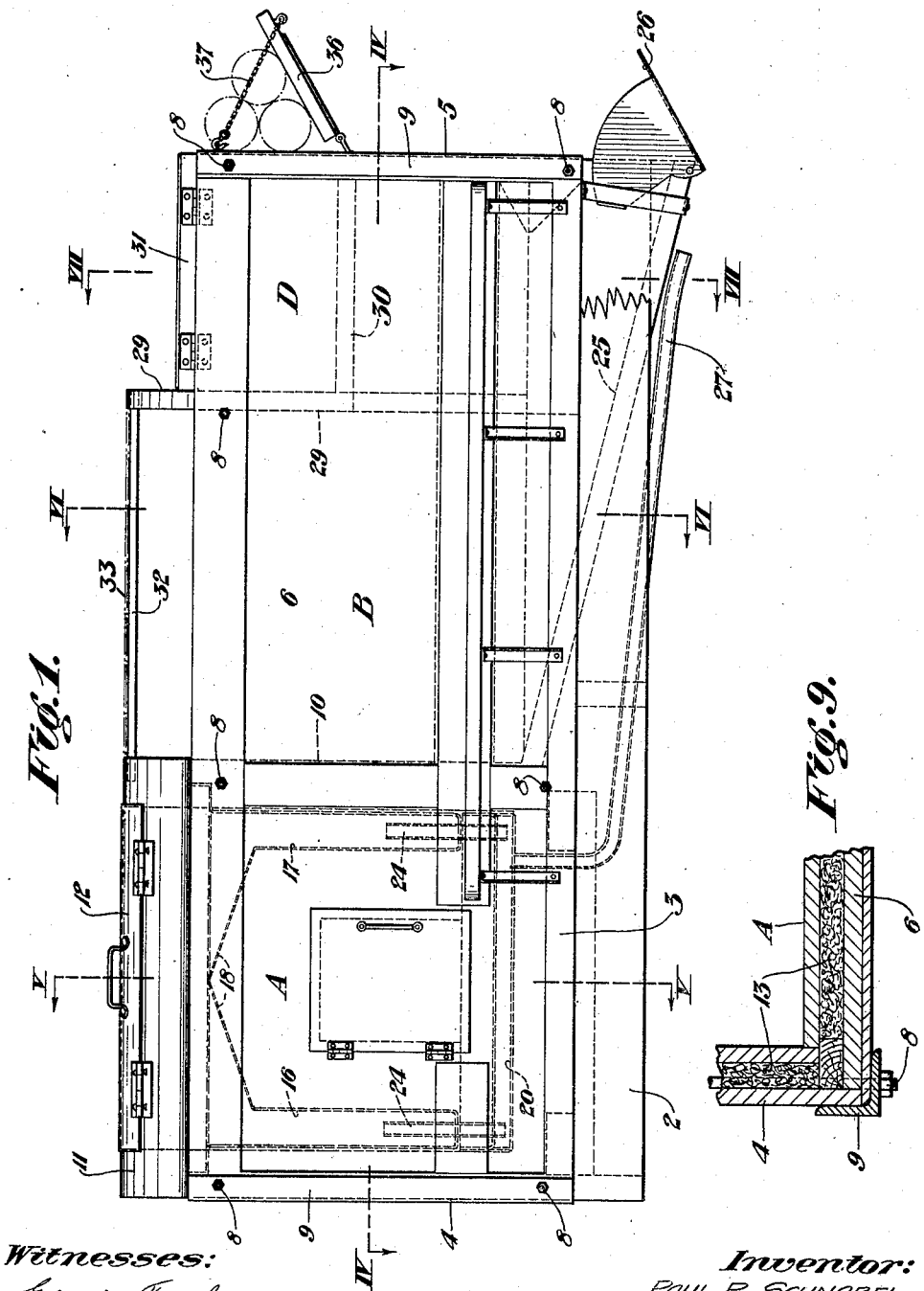
Figure 2:
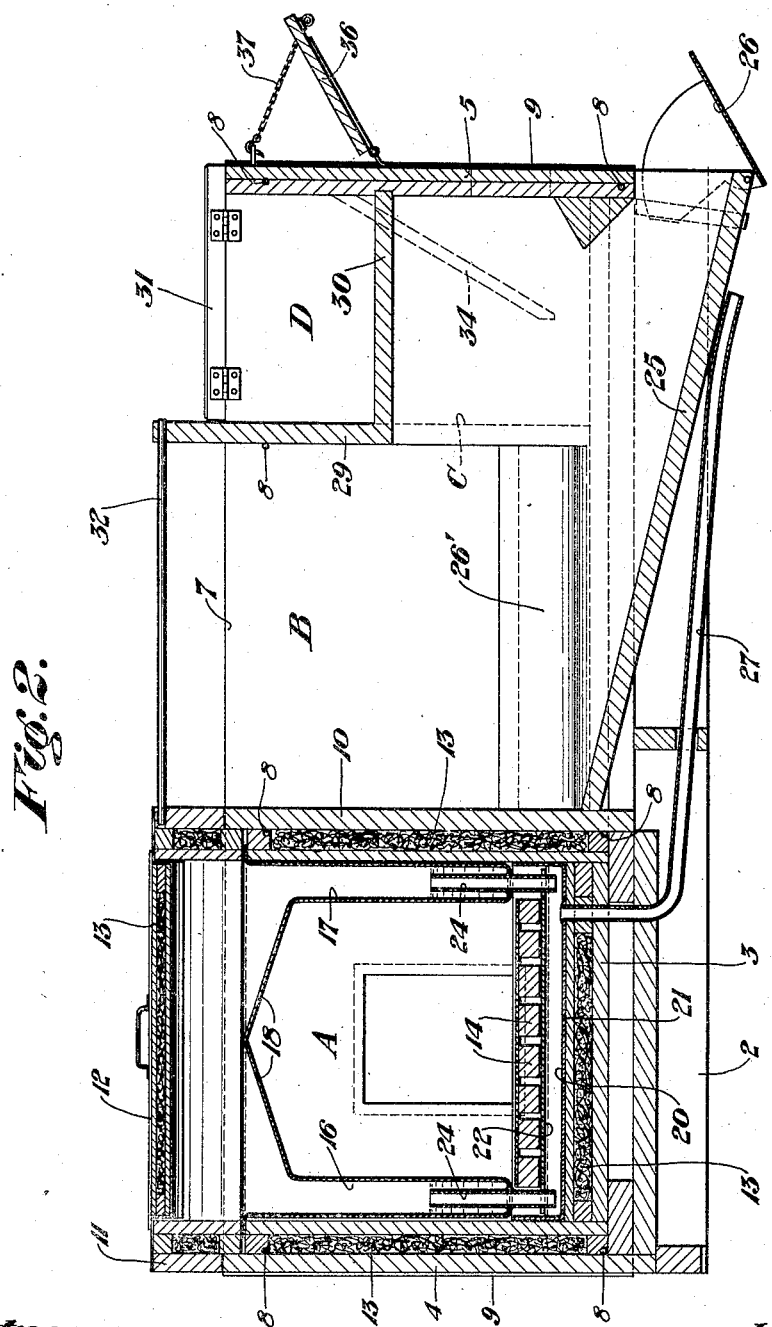
Figure 2 is a longitudinal sectional elevation taken on the line II—II of Figure 3.
Figure 3:
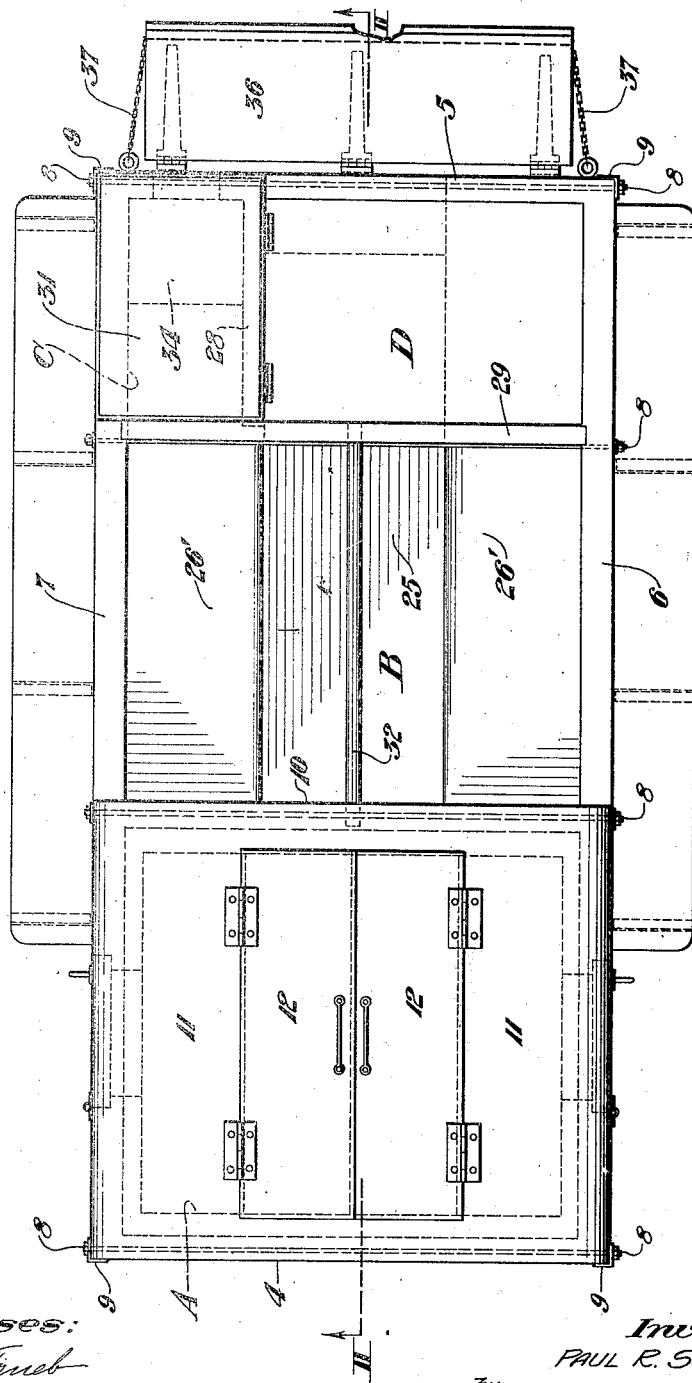
Figure 3 is a top plan view.
Figure 4:
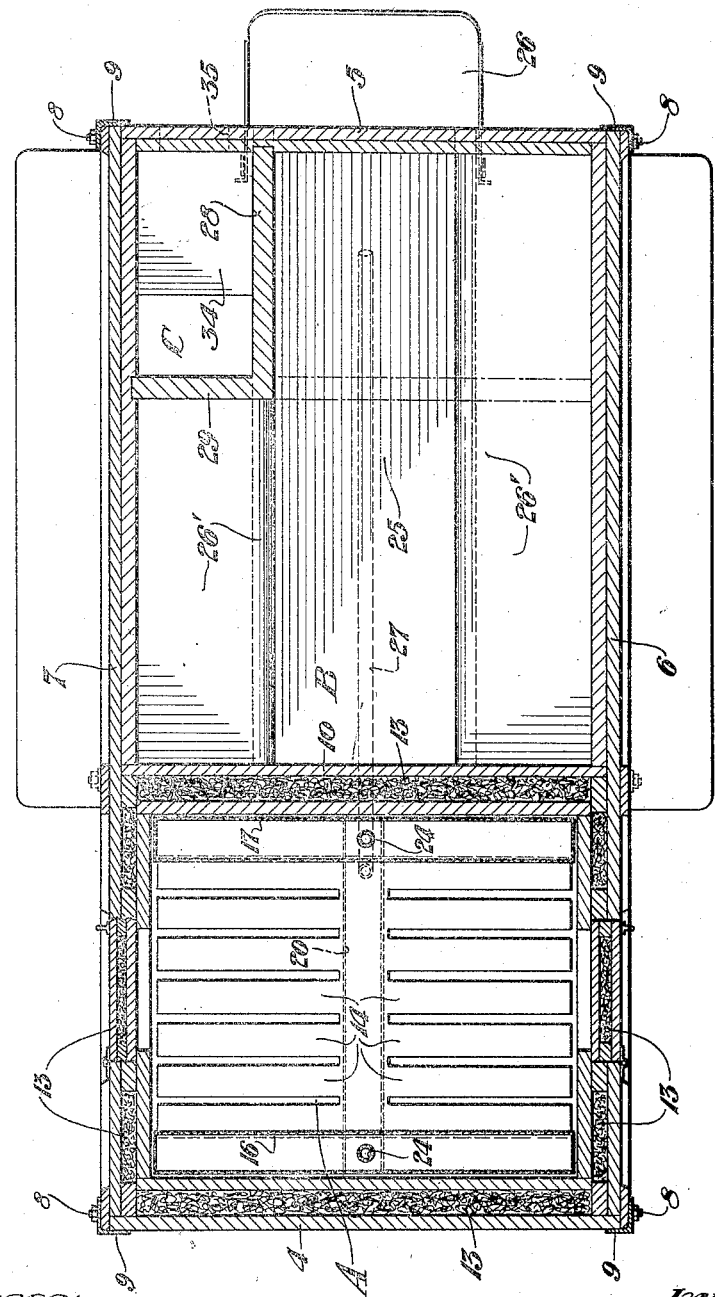
Figure 4 is a sectional plan taken on the line IV—IV of Figure 1.
Figure 5:
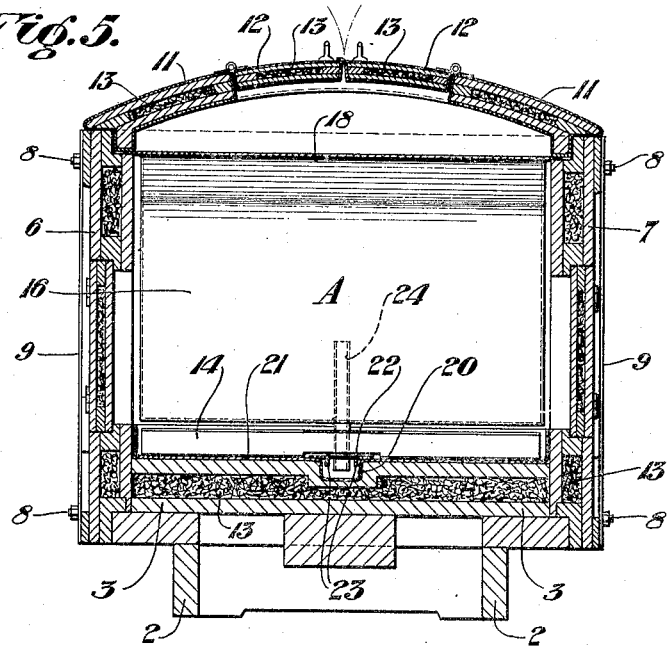
Figure 6:
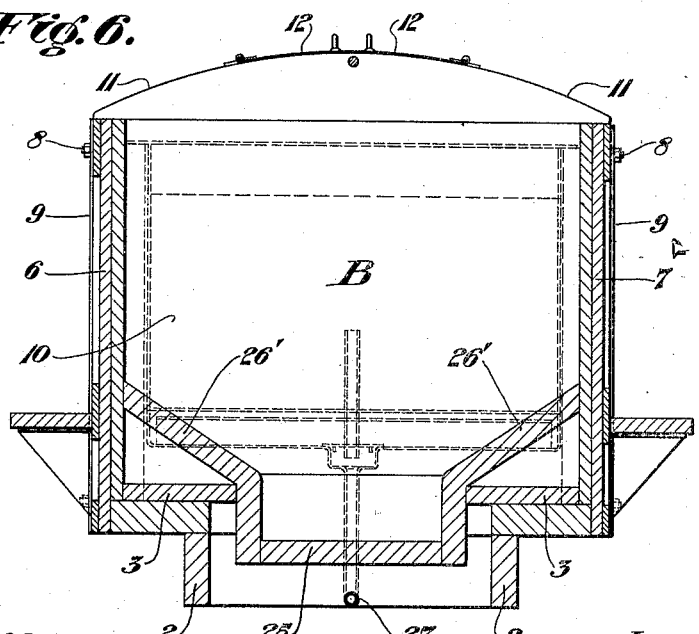

Referring more particularly to the drawings, the body comprises, generally, a product refrigerating storage compartment A, an ice storage compartment B, in the rear of said product compartment and extending from said product compartment A to the rear end wall of the body for a part of its length, a salt compartment C in the one rear corner of said body, and an open top storage compartment D, between the inner side wall of the salt compartment C and the opposite side wall of the body, and extending down into the ice compartment B. The open top storage compartment D, is adapted to hold empty containers as they are collected from the customers.

The body is composed of suitable sill members 2 upon which is built the bottom wall 3. The front and back end walls 4 and 5 and side walls 6 and 7 are interfitted with each other and with the bottom wall 3 at their points of abutment, and the whole structure is removably secured together by the bolts 8 which pass through from side to side of the body. The corners of the body are bound with strengthening angle irons 9.

A suitable transverse dividing wall 10 is secured in the body at a suitable distance to the rear of the front end wall 4 and serves as the back wall of the product storage compartment A, and a removable top wall or closure member 11 is mounted on the front end wall 4, side walls 6 and 7 and wall 10 to close the top of the compartment A. The member 11 is provided with suitable hinged door members 12 for a purpose to be described.

All of the walls surrounding the compartment A are preferably packed with heat insulating material 13, as is common in refrigerator construction, to lessen the effect of warm outside air upon the interior temperatures of the compartment.

The compartment A is provided with a rack 14 on the floor thereof, and is provided with ice or refrigerating tanks 16 and 17 extending upwardly from the level of the rack 14 along both the front and back walls. The tanks 16 and 17 have their inner side walls joined by a top wall 18, which is inclined upwardly from each tank to the center of the compartment A, and the highest point of which terminates materially below the top closure wall 11 of the compartment. The tanks 16 and 17 and the space above the top wall 18 is adapted to be packed with a mixture of salt and crushed ice, very much in the same manner that ice cream and the like is now packed in containers. The ice and salt mixture is adapted to be loaded into the tanks 16 and 17 and the space above the wall 18 through the doors 12.

The portion of the bottom wall 3 forming the bottom of the compartment A is cut away to form a trough 20, which together with the bottom wall of the compartment is lined with sheet metal 21. A suitable cover plate 22 having retaining flanges 23 adapted to fit within the trough is provided to prevent foreign matter entering the trough, and since this cover is removable, it may readily be removed to provide for cleaning the trough when desired.

The tanks 16 and 17 are provided with overflow outlet conduits 24 which extend from a point materially above the bottom of the tanks downwardly through the bottom of the tanks and enter the trough 20. The above described arrangement of overflow outlet conduits 24 provides for a body of brine to form in the lower portion of each tank as the ice and salt mixture with which the tanks are filled melts. This brine serves as a cooling medium even after the ice has all been melted, and while a quantity of ice is still in the tanks, serves to increase the refrigeration. Experience has shown that tanks constructed as above, so as to retain a quantity of brine, will lower the temperature in the refrigerating chamber A materially below zero, which is sufficiently low to actually increase the freezing of the goods carried, while tanks without this feature will not even lower the temperature sufficient to maintain the frozen condition of the goods.

The ice compartment B extends from the back wall of the compartment A, or partition wall 10, to the rear end wall 5 of the body. However, the salt compartment C and storage compartment D are taken out of the ice compartment.

The bottom wall of the ice compartment is provided with a centrally arranged downwardly and rearwardly inclined chute 25 extending along its entire length, and is provided at its rear end with a hopper-like closure 26 adapted to form a hopper or pocket for receiving the ice when open and to prevent spillage when closed. The floor portions 26' of the ice compartment are inclined upwardly and outwardly toward the side walls of the body along each side of the chute 25 to provide a hopperlike bottom, thus facilitating the movement of the ice down into the chute 25.

A suitable drain conduit 27, having its rear end in communication with the forward end of the trough 20 is secured under the chute 25 and extends rearwardly to approximately the rear end of the vehicle body, thus providing for the escape of the overflow brine from the tanks 16 and 17 at a point where said brine will not flow onto parts of the vehicle chassis, since said brine is injurious to metal.

The salt compartment C and storage compartment D are formed within the ice compartment by providing a vertical wall 28, which extends forwardly from the rear wall 5 entirely to the one side of the chute 25 for a short distance, and a transverse wall 29 which extends between the side walls of the body and is secured to the wall 28. It will thus be seen that a salt receptacle or compartment is formed in the one rear corner of the body, which is bounded on the back by a portion of the rear wall 5 of the body and on the outside by a portion of the side wall 6, and on the inside and forward end by the walls 28 and 29 respectively. The wall 29 is cut away on a line with the wall 28 up to a point intermediate the top and bottom of the body and a horizontal wall 30, forming the bottom of the compartment D, is secured between the rear end wall 5, and wall 29 and extends transversely from the inside wall 28 of the salt compartment to the opposite side wall 4 of the body. It will thus be seen that the ice storage compartment extends along the side of the salt compartment C and under the storage compartment D to the rear wall 5 of the body.

A suitable hinged closure 31 is secured to the side wall 28 of the salt compartment and is adapted to close said compartment.

The upper ends of the partition walls 10 and 29 are curved or rounded, as is also the top member 11 of the refrigerating or product compartment, and a supporting or ridge bar 32 extends between the partition walls 10 and 29, thus providing a suitable support for a tarpaulin or other cover 33 (shown dotted in Figure 1) for protecting the ice in the compartment B.

The salt compartment C is provided adjacent its lower end with a forwardly and downwardly inclined baffle plate 34 adapted to cause the salt in the compartment to flow toward the front of the compartment, and a delivery opening 35 is provided in the rear wall 5, through which access is had for the removal of the salt as desired.

A suitable hinged shelf or gate member 36 is secured to the rear wall 5 of the body and is supported in extended position by chains 37. This shelf may be used for carrying empty product cans, buckets, or other implements, as desired.

From the above it will be readily understood by those skilled in the art, that the vehicle body above described is novel in many respects; it provides an improved refrigerating product compartment, it provides a large ice carrying compartment, its salt compartment is so located and designed that the salt may be more easily obtained by the operator, and, finally, it provides a structure which may readily be knocked down for shipment.

While I have described and illustrated only one specific embodiment of my invention, it will be expressly understood that I do not wish to be limited specifically thereto, since various modifications may be made without departing from the scope of my invention as defined in the appended claim.

I claim—

In a vehicle body for the transportation of frozen products, a product compartment having its back, front, side, bottom and top outer walls packed with heat insulating material, ice tanks extending from the bottom of said compartment upwardly along the back and front walls, said tanks being joined by a top wall which extends between the inside walls of said tanks and is inclined upwardly from each tank to the center of said compartment, said tanks and the space above said top wall joining said tanks being adapted to be packed with a mixture of salt and ice, a drainage trough formed below the floor level of said compartment, extending centrally therein and inclined from front to back, a removable solid cover plate secured over said trough, vertically disposed overflow conduits rigidly mounted in said tanks and extending from a point within and approximately one-third the height of said tanks above the bottoms thereof, downwardly through said tanks and communicating with said drainage trough, said overflow conduits being adapted to permit the accumulation of a body of brine formed by the melting of the ice and salt mixture in said tanks entirely filling said tanks for approximately one-third their height, and a drainage conduit extending from the rear end of said trough to a point adjacent the rear of the body, said drainage conduit being adapted to discharge the excess brine beyond the chassis of the vehicle.

In testimony whereof I have hereunto signed my name.

PAUL R. SCHNABEL.